3,647,880
NOVEL FRAGRANCE MATERIALS AND
PROCESSES
Jack H. Blumenthal, Oakhurst, N.J., assignor to International Flavors & Fragrances Inc., New York, N.Y.
No Drawing. Filed Aug. 19, 1968, Ser. No. 753,728
Int. Cl. C07c 49/27, 45/00
U.S. Cl. 260—587          5 Claims

ABSTRACT OF THE DISCLOSURE

The novel ketone 4-methyl-3-pinanone, mixtures and olfactory compositions containing same, and processes for the production thereof.

BACKGROUND OF THE INVENTION

There is a continuing search for materials having desirable fragrances. Such materials are sought either to replace costly natural materials, to obviate weaknesses of natural materials, or to provide new fragrances or perfume types which have not heretofore been available. Especially desirable qualities for substances having interesting fragrances are stability in a wide variety of perfumed articles and perfume compositions, ease of manufacture, and intensity of aroma.

It is known to react α-pinene oxide with methyl alcohol in the presence of sodium methoxide to provide pinocarveol and pinocamphone. The mixture so formed is relatively uninteresting from the standpoint of perfumery.

THE INVENTION

The invention comprises the novel products as well as the novel processes and steps of processes according to which such products are manufactured, the specific embodiments of which are described hereinafter by way of example and in accordance with which it is now preferred to practice the invention.

Briefly, the present invention provides a novel pinane derivative, 4-methyl-3-pinanone having the formula

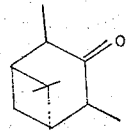

and perfume and fragrance-modifying materials containing such pinane derivative. The material is produced by reacting pinocarveol (β-pinenol-3) at subatmospheric pressure with an alkali-metal methoxide with or without a suitable reaction vehicle. The mixtures formed in the reaction can be used in perfume and fragrance-modifying compositions, and in certain preferred embodiments of the invention the novel pinanone can be recovered and used per se.

The reaction may be represented as follows:

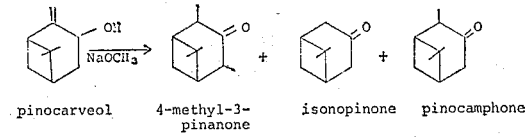

pinocarveol    4-methyl-3-    isonopinone    pinocamphone
               pinanone It will be understood from the present disclosure that the 4-methyl-3-pinanone is obtained in two stereoisomeric forms, and that both stereoisomers are encompassed. In the α-isomer both methyl groups are cis to each other and trans to the bridge; and in the β-isomer, the methyl groups are trans to each other. Separately, each of the isomers has desirable fragrance properties. The two stereoisomers will generally be considered collectively in describing the invention.

It has been found that the pinanone of this invention possesses a sweet, plant-like camphoraceous odor of good intensity and persistence. This fragrance quality particularly adapts the novel pinanone for incorporation into perfume compositions and fragrance-modifying compositions wherein a lavender fragrance character is desired. The intensity and other properties of the novel pinanone are sufficiently marked that it can be employed either as the purified material or in admixture as obtained by the novel reaction herein described.

The α-isomer of 4-methyl-3-pinanone has an $n_D^{20}$ of 1.4719.

The novel pinanone is conveniently produced from the known material pinocarveol which latter material can be obtained by the interaction of α-pinene oxide with methyl alcohol in the presence of sodium methoxide as shown by Arbuzov et al., Chemical Abstracts, 67, 116954(b) (1967). Preferably, the pinocarveol precursor is prepared in accordance with the process described in the U.S. application of Peter W. D. Mitchell, Ser. No. 732,539 filed on May 28, 1968 in which β-pinene is reacted with hydrogen peroxide and a small amount of selenium dioxide.

The reaction of this invention isomerizes and alkylates pinocarveol to yield substantial quantities of the novel pinanone. The reaction is carried out with an alkali-metal methoxide preferably in the presence of a reaction vehicle. The alkali-metals used include potassium and sodium, and sodium methoxide is preferred.

In carrying out the reaction according to the present invention, the reaction products are preferably separated from the reaction mixture as they are formed and are retained separately from the reaction mixture. The reaction is accordingly carried out at subatmospheric pressures, generally below 0.5 atmosphere. The best results have been obtained with reaction pressures of from 5 mm. Hg to 60 mm. Hg, and the preferred pressures range from 10–20 mm. Hg. However, the reaction can also be carried out at atmospheric pressures within the reaction temperature range of 80–250° C. without removal of the product during the reaction.

Although the reaction can be carried out in the absence of a reaction vehicle, it is generally preferred to use one. The reaction vehicle is an inert material which is liquid at the reaction temperatures and which further has a relatively low vapor pressure so that it will permit refluxing of the reaction mixture at the subatmospheric pressures utilized in the reaction. The vehicles are desirably miscible with pinocarveol. Especially suitable reaction vehicles include aliphatic, alicyclic, and aromatic hydrocarbons which are liquids at room temperature, and mixtures containing such hydrocarbons. A preferred reaction vehicle is a mineral oil such as Primol D.

The reaction is carried out at a temperature of 80–250° C. to provide an adequate reaction rate while avoiding undue ebullition of the reactants and vehicle. The reaction is conveniently carried out at the reflux temperature of the reaction mixture, and this is preferably about 95–250° C.

The amounts of the reactants used may vary over wide limits. Generally the pinocarveol is present in excess of the molar amount of alkali metal methoxide The molar ratio of pinocarveol to sodium methoxide can vary from about 1 to 1 to about 10 to 1 and, preferably, the molar ratio is from about 3.5 to 1 and about 8 to 1.

The reaction product is recovered from a receiver associated with the reflux condenser and can be washed and dried or otherwise preliminarily treated for purification. The mixture so obtained carries the desirable sweet camphoraceous fragrance note of the novel 4-methyl-3-pinanone, and for certain uses, the entire mixture can be directly employed in compound perfumes and fragrance-modifying compositions. By far the greater portion of the 4-methyl-3-pinanones obtained is the alpha isomer.

When greater odor intensity or a purer product is required, the novel pinanones can be separated from the other products by suitable techniques such as distilllation, extraction, preparative chromatographic techniques and the like. A purification technique used with good effect is fractional distillation under vacuum. This resolves the reaction product into the 4-methyl-3-pinanone stereoisomers, isonopinone [7,7 - dimethyl bicyclo-(3.1.1)-heptanone-3] and pinocamphone (pinanone-3), the latter two materials also being present in the reaction product.

Both the α and the β isomers are useful collectively or individually. β-Isomer has a woody aroma and the α-isomer has a sweeter herb-like fragrance note. The 4-methyl-3-pinanones and the reaction product containing them can be incorporated into a wide variety of compositions which will be enhanced by the sweet camphoraceous fragrance note. As noted above, the novel materials can be added to perfume compositions in the pure form or as obtained from the reaction. They can be added to mixtures of materials in fragrance-modifying compositions to provide a desired fragrance character to a finished perfume material or other article. A fragrance-modifying composition is one which does not of itself provide a total fragrance impression (as would a perfume composition), but it enhances, reinforces or fortifies another composition to provide a finished perfume or overall fragrance.

The perfume and fragrance compositions obtained according to this invention are suitable in a wide variety of perfumed articles and can also be used to enhance, modify or reinforce natural fragrance materials. It will thus be appreciated that the pinanone of this invention is useful as an olfactory agent and fragrance.

The term "perfume composition" is used herein to mean a mixture of compounds, including, for example, natural oils, synthetic oils, alcohols, aldehydes, ketones, esters, lactones, and frequently hydrocarbons which are admixed so that the combined odors of the individual components produce a pleasant or desired fragrance. Such perfume compositions usually contain: (a) the main note or the "bouquet" or foundation-stone of the composition; (b) modifiers which round off and accompany the main note; (c) fixatives which include odorous substances which lend a particular note to the perfume throughout all stages of evaporation, and substances which retard evaporation; and (d) top-notes which are usually low-boiling fresh-smelling materials. Such perfume compositions or the novel materials of this invention can be used in conjunction with carriers, vehicles, solvents, rispersants, emulsifiers, surface-active agents, aerosol propellants, and the like.

In perfume compositions the individual components contribute their particular olfactory characteristics, but the overall effect of the perfume composition will be the sum of the effect of each ingredient. Thus, the pinanone of this invention can be used to alter the aroma characteristics of a perfume composition, for example, by highlighting or moderating the olfactory reaction contributed by another ingredient of the composition.

The amount of pinanone of this invention which will be effective in perfume compositions depends on many factors, including the other ingredients, their amounts and the effects which are desired. It has been found that perfume compositions containing as little as 3.0% by weight of mixtures or compounds of this invention, or even less can be used to impart a sweet camphoraceous odor to soaps, cosmetics and other products. It is well suited to use in preparation of lavender fragrances. The amount employed will depend on considerations of cost, nature of the end product, the effect desired in the finished product, and the particular fragrance sought. All parts, proportions, percentages, and ratios herein are by weight, unless otherwise indicated.

The pinanone disclosed herein and reaction-mixtures containing it can be used alone, in a fragrance-modifying composition, or in a perfume composition as an olfactory component in detergents and soaps; space deodorants; perfumes; colognes; bath preparations such as bath oil, bath salts; hair preparations such as lacquers, brilliantines, pomades, and shampoos; cosmetic preparations such as creams, deodorants, hand lotions, sun screens; powders such as talcs, dusting powders, face powder and the like. When the pinanone of this invention is used in perfumed articles such as the foregoing, it can be used in amounts of 0.1% or lower. Generally it is preferred not to use more than about 1.0% in the finished perfumed article, since the use of too much will tend to unbalance the total aroma and will needlessly raise the cost of the article.

The following examples serve to illustrate embodiments of the invention as it is now preferred to practice it. It will be understood that these examples are illustrative and the invention is to be considered restricted thereto only as indicated in the appended claims.

Example I

The following ingredients are paced in a two-liter distillation flask equipped with an 18-inch Goodloe column and an automatic reflux head:

| Ingredient: | Amount (grams) |
|---|---|
| Pinocarveol (6 mols) | 912 |
| Sodium methylate (0.83 mole) | 45 |
| "Primol D" mineral oil | 100 |

The flask pressure is set at 15 mm. Hg and the reaction mixture is heated to reflux. The takeoff of reaction product is begun as soon as the mixture commences refluxing and is conducted at 7:1 reflux ratio. During the course of the reaction, the reaction mass temperature rises from 102° C. to 250° C.

After the bulk of the material is distilled from the reaction mixture it is borated with boric acid to remove the starting acohol entrained in the product. The 447 g. of distilled material so obtained is re-fractionated yielding a product boiling from 85–93° C. at 15 mm. Hg. The product contains large quantities of the novel 4-methyl-3-pinanones and may be employed as such or further fractionated to recover substantially pure 4-methyl-3-pinanones from the other pinane derivatives produced in the reaction.

Similar results are obtained using other alkali-metal methoxides such as potassium, in lieu of the sodium methoxide.

Example II

The procedure described in Example I above is carried out using the following materials.

| Ingredient: | Amount (grams) |
|---|---|
| Pinocarveol | 620 |
| Sodium methylate | 62 |
| Primol D | 100 |

There is obtained 460 grams of crude distillate containing 4-methyl-3-pinanones, isonopinone and pinocamphone.

Example III

The following mixture is prepared:

| Ingredient: | Amount (parts by weight) |
|---|---|
| Coumarin | 2 |
| Sandalwood oil | 1.5 |
| Origanum oil | 0.5 |
| Clovebud oil | 1 |
| Rosemary oil | 8 |
| Bergamot oil | 100 |
| Lemon coldpress | 50 |
| Petitgrain oil | 10 |
| Lavandin oil | 15 |
| Tincture of benzoin | 20 |

To the composition, in three separate experiments, 20 parts of 4-methyl-3-pinanone is added to form Mixture A; 20 parts of pinocamphone to form Mixture B; and 20 parts of isonopinone to form Mixture C. In the case of Mixture A a pleasing new and different quality of fragance results giving an interesting variation to the basic classic cologne blend. In the case of Mixtures B and C an increased camphory aroma, accentuating the rosemary and lavandin note but not otherwise modifying this well-known type is detected.

It will be appreciated from the present description that the novel pinanone derivatives and the reaction product mixture containing them can be included in other perfume compositions and in other perfumed articles such as detergents, shampoos, powders, soaps, deodorants, sachets, paper goods, and the like.

What is claimed is:

1. A process for the preparation of pinanones which comprises heating a mixture of pinocarveol and sodium or potassium methoxide to a temperature of from 80° C. to 250° C. under a pressure of from 5 mm. Hg to 0.5 atmosphere to form pinanones and withdrawing the pinanones so produced.

2. The process of claim 1 wherein the mixture additionally inclues a mineral oil reaction vehicle.

3. The process of claim 1 wherein the methoxide is sodium methylate.

4. The process of claim 1 wherein the heating is carried out at reflux temperature.

5. The process of claim 4 wherein the pinanones are separated to provide substantially pure 4-methyl-3-pinanone.

References Cited
UNITED STATES PATENTS

| | | | |
|---|---|---|---|
| 2,803,659 | 8/1957 | Booth et al. | 260—587 |
| 2,945,067 | 7/1960 | Klein | 260—587 |

BERNARD HELFIN, Primary Examiner

N. P. MORGENSTERN, Assistant Examiner

U.S. Cl. X.R.

252—522, 89, 132; 424—43, 47, 59, 63, 65, 69, 70, 71, 76

UNITED STATES PATENT OFFICE
CERTIFICATE OF CORRECTION

Patent No. 3,647,880   Dated   March 7, 1972

Inventor(s) JACK H. BLUMENTHAL

It is certified that error appears in the above-identified patent and that said Letters Patent are hereby corrected as shown below:

Col. 2, line 62, insert a period (.) after "methoxide".

Col. 3, line 51, "respersants" should be --dispersants--

Col. 3, line 69, insert "the" between "in" and "preparation".

Col. 4, line 24, "paced" should read --placed--.

Col. 6, line 4, correct the spelling of "includes"

Col. 6, line 9, change "4" to read --1--.

Signed and sealed this 26th day of December 1972.

(SEAL)
Attest:

EDWARD M. FLETCHER, JR.          ROBERT GOTTSCHALK
Attesting Officer                Commissioner of Patents